(12) United States Patent
Kotzur

(10) Patent No.: US 9,886,204 B2
(45) Date of Patent: *Feb. 6, 2018

(54) SYSTEMS AND METHODS FOR OPTIMIZING WRITE ACCESSES IN A STORAGE ARRAY

(71) Applicant: DELL PRODUCTS L.P., Round Rock, TX (US)

(72) Inventor: Gary B. Kotzur, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/989,635

(22) Filed: Jan. 6, 2016

(65) Prior Publication Data

US 2016/0117120 A1    Apr. 28, 2016

Related U.S. Application Data

(63) Continuation of application No. 14/595,437, filed on Jan. 13, 2015, now Pat. No. 9,262,085, which is a continuation of application No. 13/420,068, filed on Mar. 14, 2012, now Pat. No. 8,949,527.

(51) Int. Cl.
  *G06F 3/06*    (2006.01)
  *G06F 11/10*   (2006.01)

(52) U.S. Cl.
  CPC .......... *G06F 3/0616* (2013.01); *G06F 3/0619* (2013.01); *G06F 3/0638* (2013.01); *G06F 3/0665* (2013.01); *G06F 3/0689* (2013.01); *G06F 11/1076* (2013.01)

(58) Field of Classification Search
  USPC .......................................... 711/114
  See application file for complete search history.

(56) References Cited

U.S. PATENT DOCUMENTS

| | | | | |
|---|---|---|---|---|
| 2003/0188097 | A1* | 10/2003 | Holland | G06F 11/1076 711/114 |
| 2004/0117551 | A1* | 6/2004 | Wang | G06F 3/0626 711/114 |
| 2005/0097388 | A1* | 5/2005 | Land | G06F 13/4022 714/5.1 |
| 2005/0114596 | A1 | 5/2005 | Golding | 711/114 |
| 2006/0095662 | A1* | 5/2006 | Arnott | G06F 3/04847 711/114 |
| 2006/0101205 | A1 | 5/2006 | Bruning et al. | 711/114 |

(Continued)

*Primary Examiner* — Prasith Thammavong
(74) *Attorney, Agent, or Firm* — Baker Botts L.L.P.

(57) ABSTRACT

A method may include storing data in one or more first-type stripes spanning a plurality of N storage resources and having N−1 data strips for storing the data and a parity strip for storing parity information for the data stored to the particular first-type stripe and each of the plurality of storage resources includes one of a data strip or a parity strip of the particular first-type stripe if the data to be stored exceeds a threshold size. If the data to be stored does not exceed a threshold size, the method may include storing the data in a second-type stripe and a third-type stripe each spanning N storage resources, such that each stripe comprises N−1 data strips for storing the data and a metadata strip for storing address information for the corresponding second-type strip or third-type strip.

20 Claims, 2 Drawing Sheets

(56) References Cited

U.S. PATENT DOCUMENTS

| | | | |
|---|---|---|---|
| 2006/0218360 A1* | 9/2006 | Burkey | H04L 67/1095 |
| | | | 711/154 |
| 2007/0174333 A1 | 7/2007 | Lee et al. | 707/103 R |
| 2013/0067273 A1 | 3/2013 | Fiske et al. | 714/6.12 |

* cited by examiner

SYSTEMS AND METHODS FOR OPTIMIZING WRITE ACCESSES IN A STORAGE ARRAY

RELATED APPLICATION

This application is a continuation of U.S. patent application Ser. No. 14/595,437 filed Jan. 13, 2015; which is a continuation of U.S. patent application Ser. No. 13/420,068 filed Mar. 14, 2012, now U.S. Pat. No. 8,949,527 granted Feb. 3, 2015, and which is hereby incorporated by reference in its entirety for all purposes.

TECHNICAL FIELD

The present disclosure relates in general to information handling systems, and more particularly to optimizing write accesses in a storage array.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of physical storage resources, such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a server chassis, to hundreds of physical storage resources disposed in one or more separate storage enclosures.

The most common RAID levels in use today are RAID0, RAID1, RAID5, and RAID6. For RAID with redundancy, RAID1 or RAID10 mirroring may provide the highest performance with the least degradation to write performance. However, the downside to mirroring is that it halves the available storage capacity. RAID5 and RAID6 are more capacity-efficient, but often have poorer write performance due the fact that such arrays must employ read-modify-write operations when performing a write, in order to calculate parity information needed to ensure redundancy. In addition to increased latency, stress placed on physical storage devices during read-modify-write operations, particularly solid state storage devices (e.g., flash storage devices) that are increasingly used for storage of data, may reduce the useful life of such storage devices.

SUMMARY

In accordance with the teachings of the present disclosure, the disadvantages and problems associated with latency and wear in storage devices have been reduced or eliminated.

In accordance with embodiments of the present disclosure, a storage array may include a plurality of storage resources and a controller communicatively coupled to the plurality of storage resources. The controller may configured to receive a write operation and determine whether a size of data to be written to the storage array in accordance with the write operation is greater than a threshold size. The controller may further be configured to, in response to determining that the size of data is greater than the threshold size, store the data in one or more first-type stripes spanning the plurality of storage resources, such that each particular first-type stripe comprises N−1 data strips for storing the data and a parity strip for storing parity information for the data stored to the particular first-type stripe and each of the plurality of storage resources includes one of a data strip or a parity strip of the particular first-type stripe, wherein N is the number of the plurality of storage resources. The controller may also be configure to, in response to determining that the size of data is not greater than the threshold size: (i) store the data in a second-type stripe spanning the plurality of storage resources, such that the second-type stripe comprises N−1 data strips for storing the data and a metadata strip for storing address information for a third-type strip associated with the second-type strip and each of the plurality of storage resources includes one of a data strip or a metadata strip of the second-type stripe; and (ii) store the data in a third-type stripe spanning the plurality of storage resources, such that the third-type stripe comprises N−1 data strips for storing the data and a metadata strip for storing address information for the second-type strip, each of the plurality of storage resources includes one of a data strip or a metadata strip of the third-type stripe, and each individual portion of data stored the data strips of the third-type stripe is stored on a different storage resource than it is within the second-type stripe.

In accordance with these and other embodiments of the present disclosure, an information handling system may include a processor, a plurality of storage resources, and a controller communicatively coupled to the plurality of storage resources and the processor. The controller may configured to receive a write operation and determine whether a size of data to be written to the storage array in accordance with the write operation is greater than a threshold size. The controller may further be configured to, in response to determining that the size of data is greater than the threshold size, store the data in one or more first-type stripes spanning the plurality of storage resources, such that each particular first-type stripe comprises N−1 data strips for storing the data and a parity strip for storing parity information for the data stored to the particular first-type stripe and each of the plurality of storage resources includes one of a data strip or a parity strip of the particular first-type stripe, wherein N is the number of the plurality of storage resources. The controller may also be configure to, in response to determining that the size of data is not greater than the threshold size: (i) store the data in a second-type stripe spanning the plurality of storage resources, such that the second-type stripe comprises N−1 data strips for storing the data and a metadata strip for storing address information for a third-type strip associated with the second-type strip and each of the plurality of storage resources includes one of a data strip or a metadata strip of the second-type stripe; and (ii) store the data in a third-type stripe spanning the plurality of storage resources, such that the third-type stripe comprises N−1 data strips for storing the data and a metadata strip for storing address information for the second-type strip, each of the plurality of storage resources includes one of a data strip or a metadata strip of the third-type stripe, and each individual portion of data stored the data strips of the third-type stripe is stored on a different storage resource than it is within the second-type stripe.

In accordance with these and other embodiments of the present disclosure, a method may include receiving a write operation for data to be stored in a storage array comprising a plurality of storage resources and determining whether a size of data to be written to the storage array in accordance with the write operation is greater than a threshold size. The method may further include, in response to determining that the size of data is greater than the threshold size, storing the data in one or more first-type stripes spanning the plurality of storage resources, such that each particular first-type stripe comprises N−1 data strips for storing the data and a parity strip for storing parity information for the data stored to the particular first-type stripe and each of the plurality of storage resources includes one of a data strip or a parity strip of the particular first-type stripe, wherein N is the number of the plurality of storage resources. The method may also include, in response to determining that the size of data is not greater than the threshold size: (i) storing the data in a second-type stripe spanning the plurality of storage resources, such that the second-type stripe comprises N−1 data strips for storing the data and a metadata strip for storing address information for a third-type strip associated with the second-type strip and each of the plurality of storage resources includes one of a data strip or a metadata strip of the second-type stripe; and (ii) storing the data in a third-type stripe spanning the plurality of storage resources, such that the third-type stripe comprises N−1 data strips for storing the data and a metadata strip for storing address information for the second-type strip, each of the plurality of storage resources includes one of a data strip or a metadata strip of the third-type stripe, and each individual portion of data stored the data strips of the third-type stripe is stored on a different storage resource than it is within the second-type stripe.

Technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
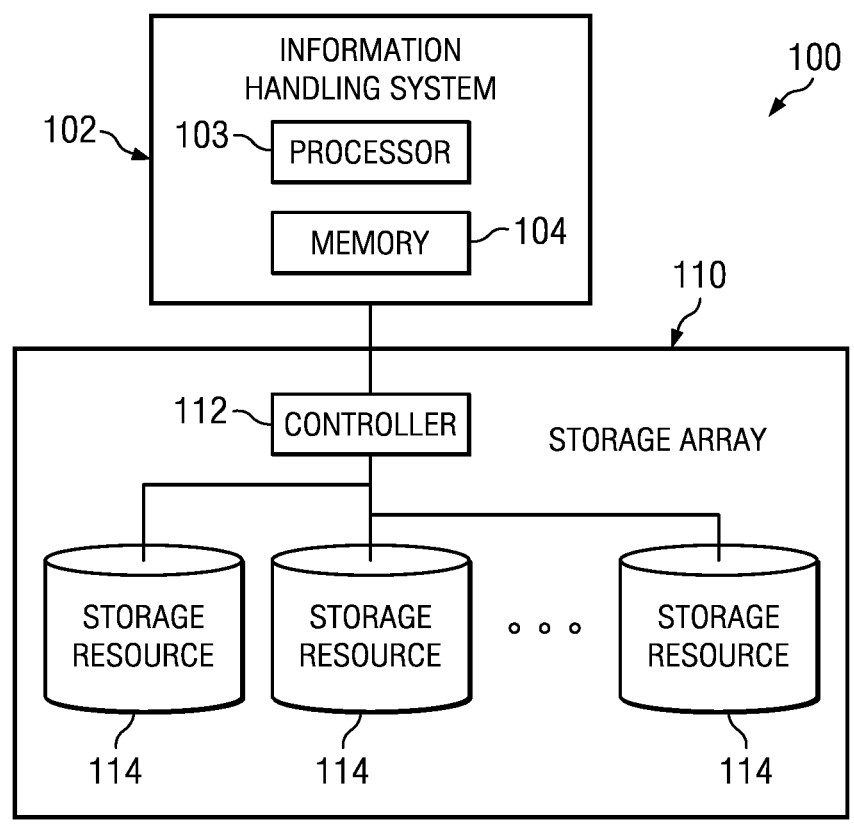
FIG. 1 illustrates a block diagram of an example system for optimizing write accesses in a storage array, in accordance with certain embodiments of the present disclosure.
Figure 2:
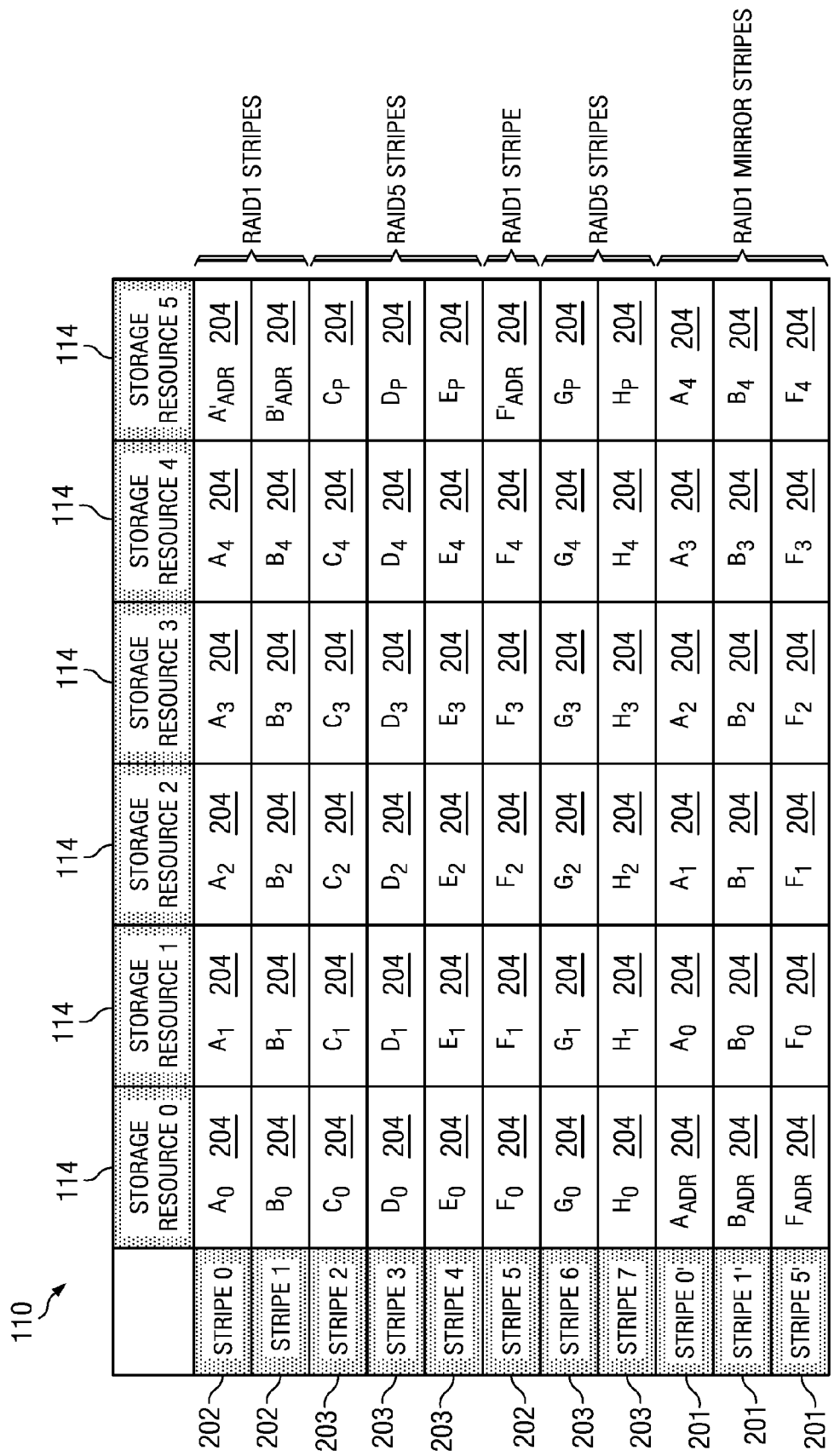
FIG. 2 illustrates a block diagram of certain portions of an example storage array, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled to an array of physical storage resources. The array of physical storage resources may include a plurality of physical storage resources, and may be operable to perform one or more input and/or output storage operations, and/or may be structured to provide redundancy. In operation, one or more physical storage resources disposed in an array of physical storage resources may appear to an operating system as a single logical storage unit or "virtual storage resource."

In certain embodiments, an array of physical storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity generation/checking. As known in the art, RAIDs may be implemented according to numerous RAID levels, including without limitation, standard RAID levels (e.g., RAID 0, RAID 1, RAID 3, RAID 4, RAID 5, and RAID 6), nested RAID levels (e.g., RAID 01, RAID 03, RAID 10, RAID 30, RAID 50, RAID 51, RAID 53, RAID 60, RAID 100), non-standard RAID levels, or others.

FIG. 1 illustrates a block diagram of an example system for optimizing write accesses in a storage array, in accordance with certain embodiments of the present disclosure;

As depicted in FIG. 1, system 100 may include an information handling system 102 and a storage array 110 communicatively coupled to information handling system 102.

Information handling system 102 may generally be operable to receive data from and/or communicate data to storage array 110. In certain embodiments, information handling system 102 may be a server. In another embodiment, information handling system 102 may be a personal computer (e.g., a desktop computer or a portable computer). In yet other embodiments, information handling system 102 may, together with storage array 110, comprise a storage sub-system. As depicted in FIG. 1, information handling system 102 may include a processor 103 and a memory 104 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Storage array 110 may comprise any system, device, or apparatus having a plurality of physical storage resources 114 communicatively coupled to information handling system 102 via controller 112. Storage resources 114 may include hard disk drives, magnetic tape libraries, optical disk drives, magneto-optical disk drives, compact disk drives, compact disk arrays, disk array controllers, and/or any computer-readable medium operable to store data. In particular embodiments, one or more storage resources 114 may comprise solid-state storage devices. In some embodiments, storage resources 114 may form all or part of a redundant storage array (e.g., a RAID). In such embodiments, storage resources 114 participating in the redundant storage array may appear to an operating system executing on information handling system 102 as a single logical storage unit or virtual resource. Thus, information handling system 102 may "see" a logical unit instead of seeing each individual physical storage resource 114. Although FIG. 1 depicts storage resources 114 as components of system 100 separate from information handling system 102, in some embodiments, one or more storage resources 114 may be integral to information handling system 102. Storage resources 114 may be housed in one or more storage enclosures configured to hold and power storage resources 114.

As depicted in FIG. 1, storage resources 114 may each be communicatively coupled to a controller 112. Controller 112 may comprise any suitable system, device, or apparatus that manages physical storage resources 114 of storage array 110 and/or presents them to information handling system 102 as logical units and/or virtual storage resources. In some embodiments, controller 112 may comprise a RAID controller. For example, if a RAID is implemented using the physical storage resources 114 of storage array 110, controller 112 may control how stored data is mirrored and/or striped among physical storage resources 114, and may present such RAID as a single logical unit or virtual storage resource to information handling system 102. In some example embodiments, controller 112 may be an integral part of a storage enclosure housing one or more of physical storage resources 114. In other embodiments, controller 112 may be an integral part of information handling system 102.

In operation, controller 112 may, in response to receipt of write operation from information handling system 102, determine the size of the data to be written in accordance with the write operation, and, based on such determined size, determine whether to perform a RAID1 write or a RAID5 write to storage array 110.

FIG. 2 illustrates a block diagram of certain portions of an example storage array 110 having a plurality of storage resources 114, in accordance with certain embodiments of the present disclosure. Although FIG. 2 depicts storage array 110 having a particular number of storage resources 114, it is understood that storage array 110 may include any suitable number of storage resources 114. As shown in FIG. 2, data may be stored in storage array 110 in a plurality of stripes 202, 203, and 201. Each particular stripe 202, 203, 201 may span across each storage resource 114 such that a strip 204 of the particular stripe 202, 203, 201 may reside on each storage resource 114. In some embodiments of the present disclosure, all strips 204 may be of the same size, and all stripes 202, 203, 201 may be of the same size. In these and other embodiments, sizes of strips 204 and stripes 202, 203, 201 may be determined in any suitable manner (e.g., by a user or administrator of system 100, by controller 112, by a manufacturer of a component of system 100, etc.).

As shown in FIG. 2, stripes 202, 203, and 201 may comprise one or more RAID1 primary data stripes 202, one or more RAID5 stripes 203, and one or more RAID1 mirrored data stripes 201. Where N is the number of storage resources 114 in storage array 110, a RAID1 primary data stripe 202 may comprise N−1 data strips 204 for storing data written to storage array 110 and a metadata strip 204 for storing address information for a RAID1 mirrored data stripe 201 mirroring the data of the RAID1 primary data stripe 202. For example, referring to FIG. 2, a RAID 1 primary data stripe 202 labeled as "Stripe 0" may include data strips 204, for storing data $A_0$, $A_1$, $A_2$, $A_3$, and $A_4$ written to storage array 110, and a metadata strip 204 for storing address information $A'_{ADR}$ for the RAID1 mirrored data stripe 201 (e.g., Stripe 0') mirroring the data $A_0, A_1, A_2, A_3$, and $A_4$. Similarly, a RAID1 mirrored data stripe 201 may span the same N storage resources 114 and comprise N−1 data strips 204 for storing mirrored data of a corresponding RAID1 primary data stripe 202 a metadata strip 204 for storing address information for the corresponding RAID1 primary data stripe 202. As shown in FIG. 2, data (e.g., $A_0, A_1, A_2, A_3,$ and $A_4$) may be stored within RAID1 mirrored data stripe 201 such that each individual mirrored portion of data is stored on a different storage resource 114 than it is within the corresponding RAID1 primary stripe 202, thus ensuring redundancy of data in the event of a failure of a storage resource 114. For example, while data $A_0$ within a RAID1 primary data stripe 202 may be stored on a strip 204 of a storage resource 114 labeled as "Storage Resource 0," its corresponding mirrored data $A_0$ within a RAID1 mirrored data stripe 201, may be stored on a strip 204 of a storage resource 114 labeled as "Storage Resource 1," thus ensuring a redundant copy of $A_0$ is available in the event of a failure of either of Storage Resource 0 or Storage Resource 1.

Where N is the number of storage resources 114 in storage array 110, a RAID5 stripe 203 may comprise N−1 data strips 204 for storing data written to storage array 110 and a parity strip 204 for storing parity information for the RAID5 stripe 203. For example, referring to FIG. 2, a stripe 203 labeled as "Stripe 2" may include data strips 204, for storing data $C_0$, $C_1$, $C_2$, $C_3$, and $C_4$ written to storage array 110, and a parity strip 204 for storing parity information $C_P$ based on a parity calculation of data $C_0$, $C_1$, $C_2$, $C_3$, and $C_4$. Such parity information allows data to be recovered in the event of a failure of a storage resource 114 (e.g., by recalculating parity).

Accordingly, controller 112 of storage array 110 may process received write operations either as RAID1 operations to store data and its associated address metadata in a RAID1 primary data stripe 202 and a corresponding RAID1 mirrored data stripe 201 or as RAID5 operations to store data and its associated parity information in a RAID5 stripe 203. As discussed above, controller 112 may determine whether to process a write operation as a RAID1 or RAID5 operation based on size of data to be written to storage array 110. For example, if the size of data to be written is equal to or lesser than a predetermined threshold size, controller 112 may process the write operation as a RAID1 operation. Alternatively, if the size of data to be written is equal to or greater than a predetermined threshold size, controller 112 may process the write operation as a RAID5 operation. In some embodiments, the predetermined threshold size may be equal to the size of a strip 204.

Furthermore, controller 112 may also be configured to select data to transfer between the regions including RAID5 stripes 203 and/or the region including RAID1 mirrored data stripes 201 as they reach their respective capacity. For example, a least-frequently used algorithm and/or least-recently used algorithm may be used to select for moving, particular data from the region including RAID5 stripes 203 and/or the region including RAID1 stripes 201/202, and/or to move data between the regions including RAID5 stripes 203 and/or the region including RAID1 stripes 201/202.

Using this approach of processing write operations as RAID1 operations for smaller writes and as RAID5 operations for larger writes, the occurrence of read-modify-write operations may be reduced as compared with traditional storage systems, thus potentially reducing latency and improving storage resource life, while at the same time allowing for some RAID5 operations in order to maximize storage capacity as compared to traditional RAID1 approaches.

Although the present disclosure has been described in detail, it should be understood that various changes, substitutions, and alterations can be made hereto without departing from the spirit and the scope of the disclosure as defined by the appended claims.

What is claimed is:

1. A storage array comprising:
a plurality of storage resources; and
a controller communicatively coupled to the plurality of storage resources, the controller configured to:
receive a write operation;
determine whether a size of data to be written to the storage array in accordance with the write operation is greater than a threshold size;
in response to determining that the size of data is greater than the threshold size, store the data in one or more first-type stripes spanning the plurality of storage resources; and
in response to determining that the size of data is not greater than the threshold size:
store the data in a second-type stripe spanning the plurality of storage resources; and
store the data in a third-type stripe, wherein:
the third-type stripe includes a mirror of the second-type stripe;
the third-type stripe spans the plurality of storage resources; and
each individual portion of data stored in the third-type stripe is stored on a storage resource that neighbors the storage resource on which the data in the second-type stripe is stored.

2. A storage array according to claim 1, wherein the threshold size is equal to the size of a strip.

3. A storage array according to claim 1, wherein:
each first-type stripe comprises a first plurality of strips;
each second-type stripe comprises a second plurality of strips;
each third-type stripe comprises a third plurality of strips; and
each strip is of equal size.

4. A storage array according to claim 1, wherein each first-type stripe, second-type stripe, and third-type stripe are of equal size.

5. A storage array according to claim 1, each first-type stripe comprising a RAID5 stripe.

6. A storage array according to claim 1, wherein the mirror of the second-type stripe is stored in accordance with RAID1.

7. A storage array according to claim 1, the controller comprising a RAID controller.

8. An information handling system comprising:
a processor;
a plurality of storage resources; and
a controller communicatively coupled to the plurality of storage resources and the processor, the controller configured to:
receive a write operation from the processor;
determine whether a size of data to be written to the storage array in accordance with the write operation is greater than a threshold size;
in response to determining that the size of data is greater than the threshold size, store the data in one or more first-type stripes spanning the plurality of storage resources; and
in response to determining that the size of data is not greater than the threshold size:
store the data in a second-type stripe spanning the plurality of storage resources; and
store the data in a third-type stripe wherein:
the third-type stripe includes a mirror of the second-type stripe; and
the third-type stripe spans the plurality of storage resources, such that each individual portion of data stored in the third-type stripe is stored on a storage resource that neighbors the storage resource on which the data in the second-type stripe is stored.

9. An information handling system according to claim 8, wherein the threshold size is equal to the size of a strip.

10. An information handling system according to claim 8, wherein:
each first-type stripe comprises a first plurality of strips;
each second-type stripe comprises a second plurality of strips;
each third-type stripe comprises a third plurality of strips; and
each strip is of equal size.

11. An information handling system according to claim 8, wherein each first-type stripe, second-type stripe, and third-type stripe are of equal size.

12. An information handling system according to claim 8, each first-type stripe comprising a RAID5 stripe.

13. An information handling system according to claim 8, wherein the mirror of the second-type stripe is stored in accordance with RAID1.

14. An information handling system according to claim 8, the controller comprising a RAID controller.

15. A method comprising:
receiving a write operation for data to be stored in a storage array comprising a plurality of storage resources;
determining whether a size of data to be written to the storage array in accordance with the write operation is greater than a threshold size;
in response to determining that the size of data is greater than the threshold size, storing the data in one or more first-type stripes spanning the plurality of storage resources; and
in response to determining that the size of data is not greater than the threshold size:
storing the data in a second-type stripe spanning the plurality of storage resources; and
storing the data in a third-type stripe wherein:
the third-type stripe includes a mirror of the second-type stripe; and
the third-type stripe spans the plurality of storage resources, such that each individual portion of data stored in the third-type stripe is stored on a storage resource that neighbors the storage resource on which the data in the second-type stripe is stored.

16. A method according to claim 15, wherein the threshold size is equal to the size of a strip.

17. A method according to claim 15, wherein:
each first-type stripe comprises a first plurality of strips;
each second-type stripe comprises a second plurality of strips;
each third-type stripe comprises a third plurality of strips; and
each strip is of equal size.

18. A method according to claim 15, wherein each first-type stripe, second-type stripe, and third-type stripe are of equal size.

19. A method according to claim 15, each first-type stripe comprising a RAID5 stripe.

20. A method according to claim 15, wherein the mirror of the second-type stripe is stored in accordance with RAID1.

* * * * *